US006681551B1

(12) United States Patent
Sheidler et al.

(10) Patent No.: US 6,681,551 B1
(45) Date of Patent: Jan. 27, 2004

(54) PROGRAMMABLE FUNCTION CONTROL FOR COMBINE

(75) Inventors: Alan David Sheidler, Moline, IL (US); Kenny L. Hennings, Tripoli, IA (US); Mark Peter Sahlin, Bettendorf, IA (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/193,069

(22) Filed: Jul. 11, 2002

(51) Int. Cl.[7] .............................................. A01D 41/02
(52) U.S. Cl. ..................................... 56/10.2 G; 701/50
(58) Field of Search ....................... 56/10.2 R, 10.2 A, 56/10.2 B, 10.2 G, 14.6, DIG. 2, 11.1; 172/2, 3, 4, 4.5, 7, 9; 37/348; 460/1, 149, 150; 701/45, 49, 50, 63, 29, 34

(56) References Cited

U.S. PATENT DOCUMENTS

| 4,450,671 A | 5/1984 | Love |
| 4,552,503 A | 11/1985 | Mouri et al. |
| 4,663,921 A | 5/1987 | Hagstrom et al. |
| 4,967,544 A | 11/1990 | Ziegler et al. |
| 5,445,563 A | 8/1995 | Stickler et al. |
| 5,469,694 A | 11/1995 | Panousheck et al. |
| 5,666,793 A | 9/1997 | Bottinger |
| 5,688,170 A | 11/1997 | Pfeiffer et al. |
| 5,775,072 A | 7/1998 | Herlitzius et al. |
| 5,995,895 A | 11/1999 | Watt et al. |
| 6,131,062 A | 10/2000 | Nielsen |
| 6,257,977 B1 | 7/2001 | Moriarty |
| 6,292,729 B2 | 9/2001 | Falck et al. |

OTHER PUBLICATIONS

John Deere, 7600, 7700, and 7800 Tractors, Operators Manual, 9 pgs., (Jul., 1992).
John Deere, JD844 Brochure, 3 pgs. (1979).
Kerley et al., An Automatic Pickup Header Height Controller For Combine Harvester, 11 pgs., (Dec., 1981).
Chmielewski, et al., Closed Loop Electro–Hydraulic Control For Combine Header Floatation And Height, 8 pgs., (Sep., 1993).
John Deere, Operator's Manual, John Deere JD 844 Loader, 4 pgs., (1980).

*Primary Examiner*—Robert E. Pezzuto
(74) *Attorney, Agent, or Firm*—Polit & Erickson, LLC (57) ABSTRACT

A function management system includes a programmable control unit that can automatically coordinate combine traction functions and/or implement functions. In a learn mode, the operator performs a sequence of manual manipulations of the operator controlled traction and implement devices, and the control unit records and then stores information pertaining to the sequence of device operations. In an execute mode, the control unit automatically performs the sequence of device operations so that the sequence of operations occurs at the same intervals at which they were learned. As one example of a sequence, when the combine approaches the end of a field, at the touch of one button, the header is raised, the unloading auger is pivoted to an inboard position for safe turning, the ground speed is increased for rapid travel, the four wheel drive used during harvesting in the field is disengaged, the crop-processing implement speed, such as a rotor speed for a rotary crop-processing unit, is decreased, and steering of the combine is controlled to position the combine to the point of reentering the field. The sequence of device operations can be pre-programmed or input by the operator in the learn mode.

10 Claims, 6 Drawing Sheets

PROGRAMMABLE FUNCTION CONTROL FOR COMBINE

TECHNICAL FIELD OF THE INVENTION

The invention relates to controls for an agricultural combine. Particularly, the invention relates to controls for traction, such as speed, braking and wheel drive engagement and for undertaking movements of the combine header, unloading auger, and separator.

BACKGROUND OF THE INVENTION

Conventional agricultural combines include a header leading the combine, having a forward gathering portion and a feederhouse portion which contains elements for processing crop material and/or transferring the crop material from the gathering portion to the body of the combine. In the body of the combine, the grain is separated from the chaff and straw, collected, and thereafter unloaded via an auger. Such combines have a variety of designs as described for example in U.S. Pat. Nos. 4,450,671; 4,663,921; 5,445,563; and 6,257,977.

The operator of a combine has to control and sequence many functions during the normal course of operation of the combine. Particularly, as the combine is harvesting a field, at the end of each row or "cut" many implements and controls on the combine need to be changed or adjusted. For example, as the combine approaches the end of the cut, the operator must push a button to raise the header, then he must push the hydrostatic transmission control handle in a forward direction to speed up the combine, and he must turn the steering wheel. The unloading auger must be swung inboard to avoid contact with external structures while turning. It is also possible that the operator needs to depress the brake pedal to get the combine to steer effectively or the operator may need to disengage the four wheel drive in order to move more quickly to the point of reentering the field again, at which time it may be desired to slow the combine while lowering the header, engaging the four wheel drive, etc. Because of the number of operations that are necessary simultaneously, a high degree of drive expertise is needed to orchestrate all of the adjustments and control changes.

SUMMARY OF THE INVENTION

The present invention provides a function management system that includes a programmable control unit which can automatically coordinate combine traction functions and/or implement functions.

The invention provides at the touch of a button, the ability to activate a series of functions for the combine. For example, as the combine approaches the end of a cut, at the touch of one end-of-cut button, the header can be raised, the unloading auger can be swung back to an inboard position for safe turning, the ground speed can be increased for rapid travel, the four wheel drive used during harvesting in the field can be disengaged, transmission gear ratio can be changed, and the crop-processing implement speed, such as a rotor speed for a rotary crop-processing unit, can be decreased. Another button can be touched to command the commencement of another sequence when the combine returns to the point of reentering the field.

According to one sequence, the machine would automatically slow to 2 kph as the header drops to the cut position, then as the machine enters the cut, the ground speed can be automatically increased to the maximum speed set by the operator, or to whatever maximum speed the combine can be operated, to maximize efficiency or to avoid overloading of the engine. The unloading auger may also automatically swing out for unloading grain as the combine is moving. The sequence of device operations can be pre-programmed or input by the operator in a learn mode.

According to another aspect of the invention, the combine steering could be automatically controlled by the function management system, especially between the end of one cut and the beginning of the next cut. The steering and combine direction could be corrected by a global positioning system in communication with the control unit.

According to a further aspect, during a "learn mode," the operator can perform a sequence of manual manipulations of the traction and implement devices, and the control unit records and then stores information pertaining to the sequence of device operations. The sequence can be correlated with the distances traveled by the combine between operations. Upon subsequent activation of a button, the control unit can then commence an "execute" or "replay" mode, wherein the control unit automatically performs the recorded sequence of device operations. Preferably, the sequence of operations is performed at the same distance intervals at which they were learned, regardless of the speed of the vehicle.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
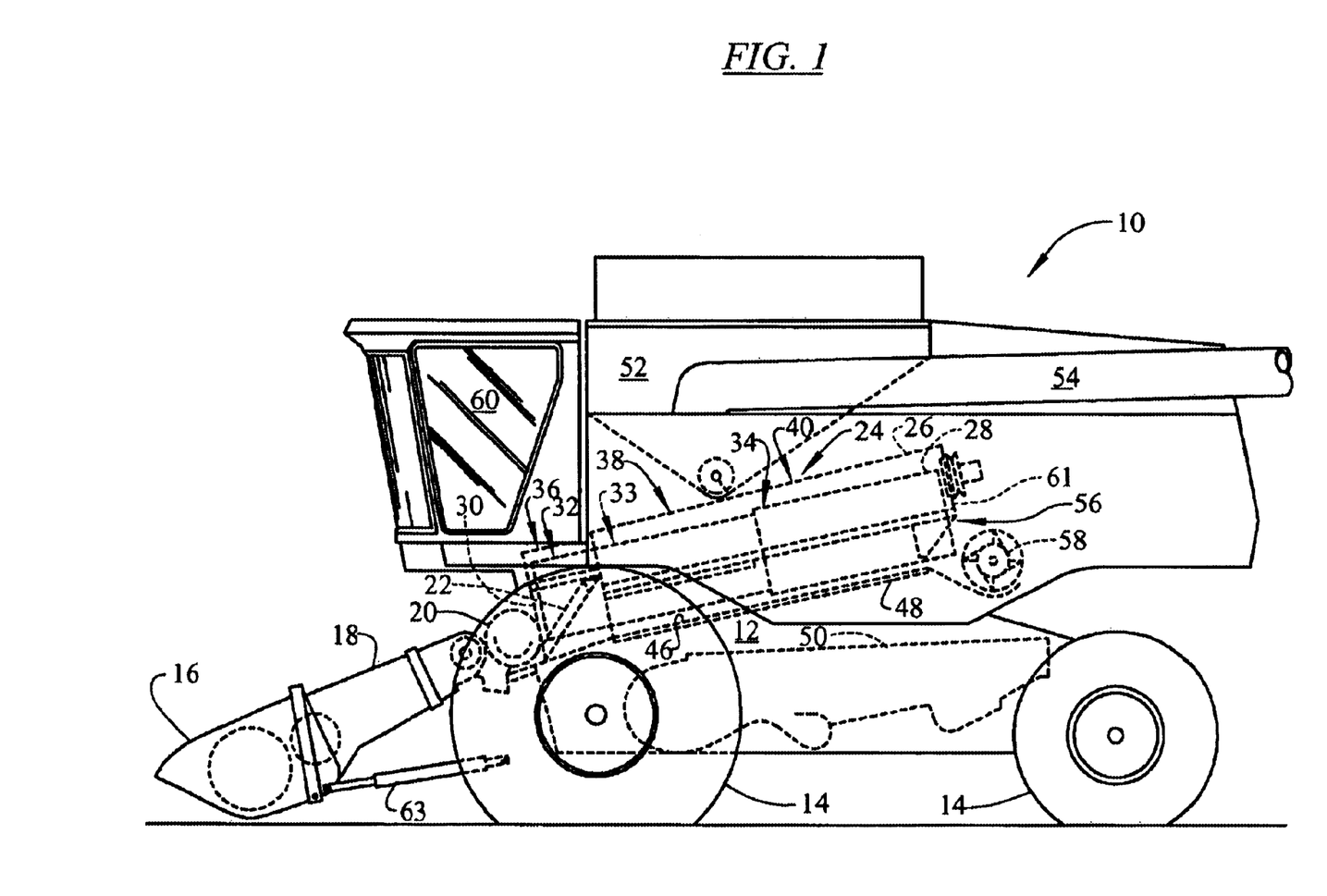
FIG. 1 is a side view of an agricultural combine having the control system of the present invention.

FIG. 1 shows an agricultural combine 10 such as disclosed in U.S. Pat. No. 6,257,977, herein incorporated by reference. The combine 10 illustrated is of the type incorporating an axial rotary crop-processing unit. The combine 10 comprises a supporting structure or chassis 12 mounting a ground engaging means 14 shown in the form of tires. Alternatively, tracks can be used in place of tires. A harvesting platform 16 is used for harvesting a crop and directing the crop to a feederhouse 18. The harvested crop is directed by the feederhouse 18 to a beater 20. The beater directs the crop upwardly to a rotary crop-processing unit 24. The rotary crop-processing unit is located between the side sheets of the combine. The side sheets form part of the supporting structure 12.

The rotary crop-processing unit 24 comprises a rotor housing 26 and a rotor 28 located within the housing. The harvested crop enters the housing through an inlet 22 at the inlet end 30 of the housing 26. The rotor is provided with an inlet feed portion 32, a threshing portion 33, and a separating portion 34. The rotor housing has a corresponding infeed section 36, a threshing section 38, and a separating section 40.

Both the threshing portion 33 and the separating portion 34 of the rotor are provided with crop engaging members (not shown). The threshing section 38 of the housing is provided with a concave 46 while the separating section 40 of the housing is provided with a grate 48. Grain and chaff released from the crop mat fall through the concave 46 and grate 48. The concave and the grate prevent the passage of crop material larger than grain or chaff from entering the combine cleaning system 50 below the rotary crop-processing unit 24.

Grain and chaff falling through the concave and grate is directed to the cleaning system 50 that removes the chaff from the grain. The clean grain is then directed by an elevator (not shown) to clean grain tank 52 where it can be directed to a truck or grain cart by unloading auger 54. Straw that reaches the end 61 of the housing is expelled through an outlet 56 to a beater 58. The beater propels the straw out the rear of the combine. The end 61 is thus the outlet end of the housing. The crop material moves through the rotary crop-processing unit in a crop flow direction from the inlet end 30 to the outlet end 61 of the housing. The operation of the combine is controlled from the operator cab 60.

The header 16 can be lifted by use of lift cylinders 63. The auger 54 can be pivoted via a cylinder or motor (not shown) about a vertical axis between an inboard orientation shown and an outboard orientation, substantially perpendicular to the traveling direction of the combine, to offload grain to a body of a truck. The auger can be pivoted inboard, substantially parallel to the direction of travel of the combine when not in use.

Figure 2:
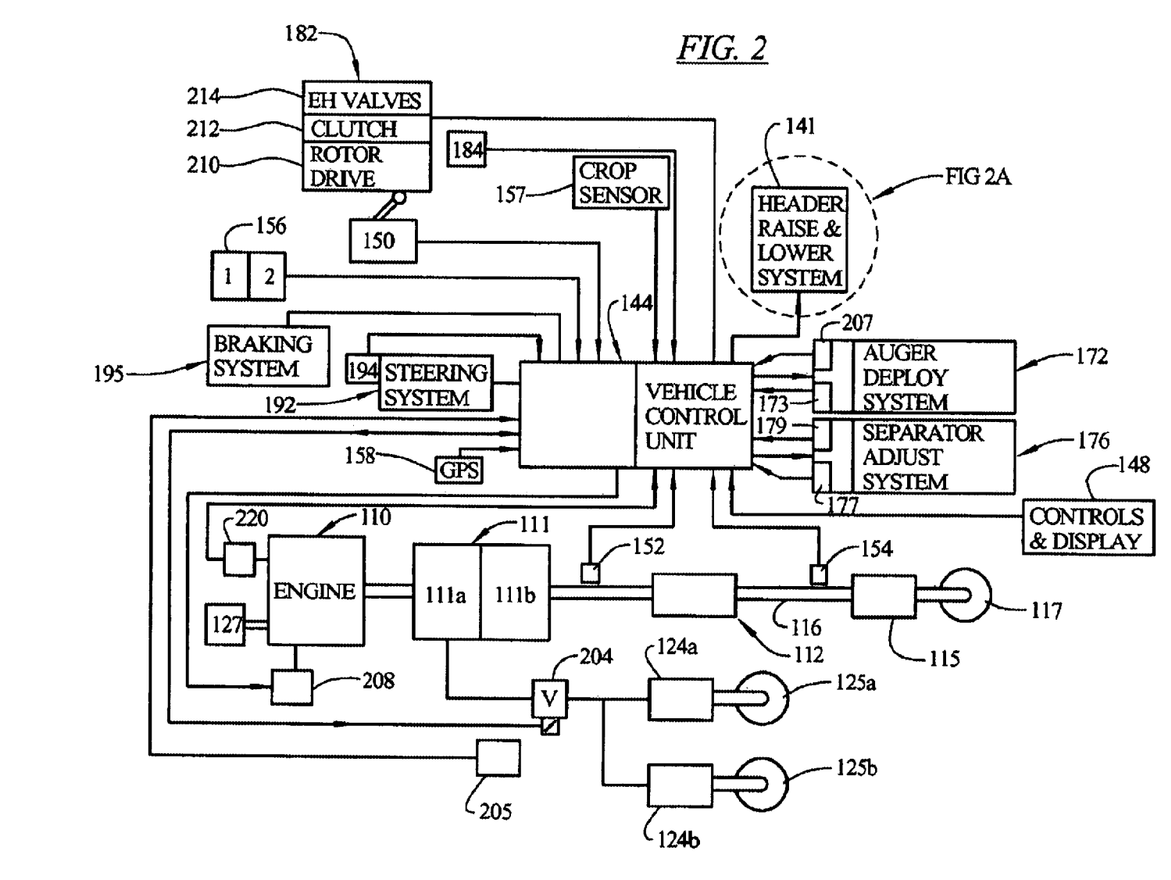
FIG. 2 is a schematic system diagram of the operating system of the invention.

FIG. 2 illustrates an exemplary operating system of the combine controlled by a vehicle control unit (VCU) 144. As will be described, many operating sub-systems, including functional and traction systems, can be controlled by the vehicle control unit (VCU) 144, including being automatically controlled according to the learn/save and execute features described below. Although in the described exemplary embodiment, many sub-systems are controlled for automatic operation, an operating system incorporating less than all the described functional and traction systems is also encompassed by the invention.

The combine includes an engine 110 which drives a hydrostatic transmission 111, which drives a POWERSHIFT transmission 112, which drives an output drive shaft 116. The shaft 116 is connected, via a differential 115, to the wheels 117 which mount the tires 14 (FIG. 1).

The hydrostatic transmission 111 includes a hydraulic pump 111a hydraulically coupled to a hydraulic motor 111b. For a combine having four-wheel drive capability, during four-wheel-drive mode, the hydraulic pump 111a is hydraulically connected to rear wheel hydraulic motors 124a, 124b, one at each rear wheel 125a, 125b. The engine 110 also drives a hydraulic pump 127 which supplies pressurized hydraulic fluid to selective control valves or levers.

The VCU 144 is preferably a microprocessor-based electronic control unit. The VCU 144 receives signals from a control and display panel 148, an engine speed sensor 152, preferably a magnetic pickup, and an axle speed sensor 154, preferably a Hall-effect sensor, which supplies an axle speed signal. The VCU 144 also receives a gear select signal from a shift lever unit 150 and sequence selection signal from a three-position (1, 2 and neutral) switch 156, such as a commercially available momentary rocker switch. The VCU 144 can receive a crop presence signal from a crop sensor 157. This sensor can be an optical sensor. The VCU 144 also receives signals from a global positioning system (GPS) 158. The global positioning system can provide to the VCU 144 the exact position of the combine from a satellite or other reference.

The VCU 144 is configured to send control signals to the header raise-and-lower system 141, to an auger deployment system 172, to a separator adjust system 176, to a separator engagement system 182, to a steering system 192, to a braking system 195, to a four-wheel drive engage valve 204, and to an engine throttle control 208.

Figure 2A:
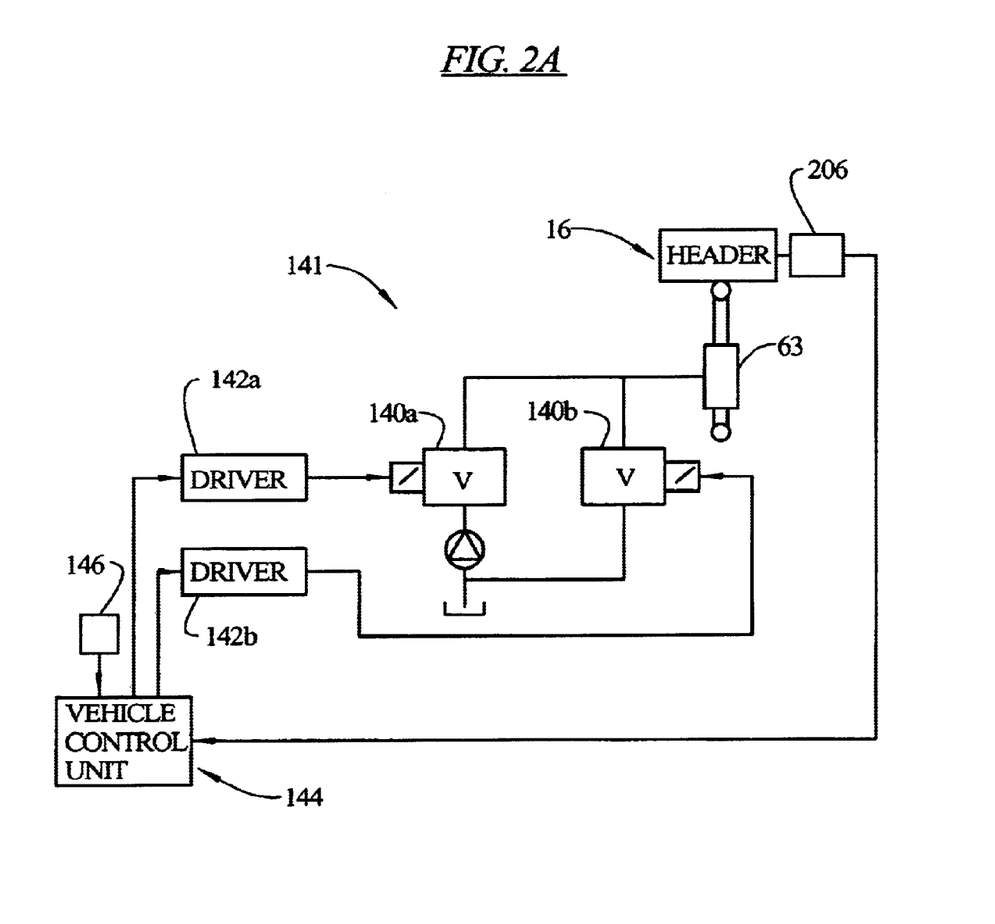
FIG. 2A is a schematic system diagram of a header raise-and-lower operating sub-system of the system shown in FIG. 2.

The header raise-and-lower system 141 is an example of a VCU controlled operating sub-system, shown in detail in FIG. 2A. The communication of hydraulic fluid to and from the cylinders 63 is controlled by a pair of solenoid operated electro-hydraulic flow control valves 140a and 140b which are operated by drivers 142a and 142b which receive electrical control signals generated by the VCU 144. The header raise-and-lower system 141 also includes a operator-initiated activator 146, signal-connected to the VCU 144. The header raise-and-lower system 141 also includes a sensor 206 signal connected to the VCU 144 to feed back header elevation. The sensor 206 can be a potentiometer attached to the feeder house that signals header elevation. Alternatively, the position could be sensed by a radar or sonar sensor sensing the actual header height above the ground.

Returning to FIG. 2, the auger deployment system 172 could include drivers and valves substantially identical to those shown for the header raise-and-lower system 141 (shown in FIG. 2A) to expand or retract a cylinder to swing the auger. An operator-initiated actuator 173 is signal-connected to the VCU 144 to deploy the auger 54 by swinging the auger perpendicularly to the direction of combine travel, or to retract the auger 54 to a position parallel to the direction of combine travel. The auger deployment system 172 also includes a sensor 207 signal-connected to the VCU 144 to feed back auger deployment position. The sensor can be a potentiometer attached between the auger and the combine body.

The separator adjust system 176 could also include such drivers and valves to expand or contract a cylinder to adjust clearances in the separator. An operator-initiated actuator 177 such as operator-controlled button, is signal-connected to the VCU 144 to cause adjustment of the separator. The system 176 can also include a sensor 179 signal connected to the VCU 144 to feed back separator clearance. The sensor can be a potentiometer connected to adjustable components of the separator.

The rotor drive 182 can be actuated by an operator-initiated actuator 184. The drive 182 includes a suitable drive element 210 which is engaged and disengaged to engine rotary power (via suitable pulleys and belts) by operation of a clutch 212. The clutch 212 is controlled by electro-hydraulic valves 214. The electro-hydraulic valves are signal-connected via drivers (now shown) to the VCU 144 and can be controlled by the VCU 144 to effectively engage or disengage engine rotary power to the combine rotor.

The steering system 192 could include drivers and valves substantially identical to those shown for the header raise-and-lower system 141 to expand or retract a cylinder to turn wheels of the combine to steer the combine. A position sensor 194 can be connected to the steering wheel and signal-connected to the VCU 144 to send a signal corresponding to the steering wheel position.

A four-wheel drive engagement valve 204 is manually actuated via an actuator 205 to engage or disengage four-wheel drive mode by supplying or diverting, pressurized hydraulic fluid to or from the motors 125a, 125b. The valve 204 is signal-connected to the VCU 144 via a suitable driver (not shown).

A throttle position sensor 220 is connected to the throttle control 208 and signal connected to the VCU 144, and which sends a signal corresponding to throttle position to the VCU 144.

Figure 3:
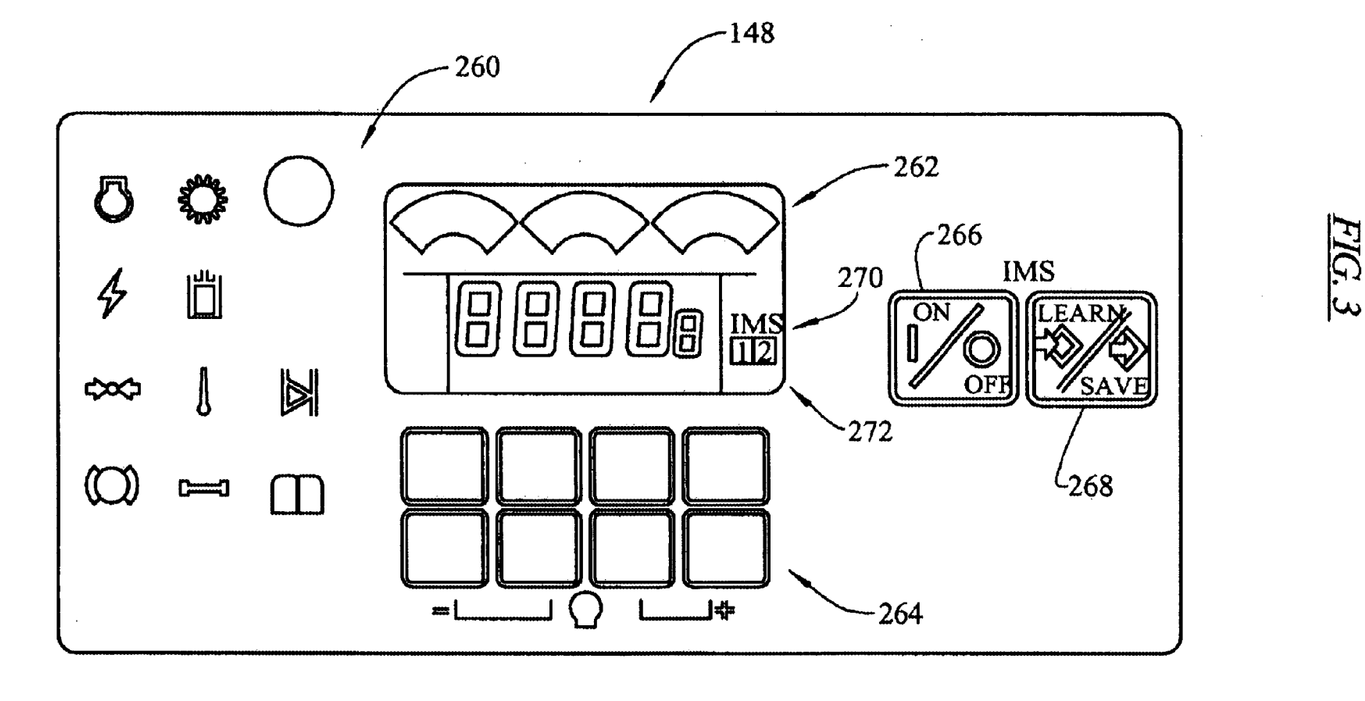
FIG. 3 is a view of a front panel face of a control/display unit of the combine of FIG. 1.

Referring now to FIG. 3, the monitor/display unit 148 is shown. The left-hand third of the monitor/display unit 148 includes a plurality of warning and status lights 260 associated with various vehicle functions, but which do not relate to the present invention. The upper portion of the middle part of the unit 148 includes a graphics/numeric display 262. The lower portion of the middle part of the unit 148 includes a plurality of touch pad switches 264 which can be used to control what parameters are displayed by the numeric display portion of display 262. The unit 148 also includes a speaker (not shown) which generates audible sounds in response to certain conditions and operations.

The right-hand third of the monitor display unit 148 includes touch pad on/off switch 266 and a learn/save touch pad switch 268, both of which are used in connection with the function management system. The lower right-hand part of the display 262 includes an implement management system (IMS) display elements 270 and one-two sequence display element 272, both of which are lit up as a function of the operational status of the present invention, as described in more detail hereinafter.

To implement the present invention, the VCU 144 executes stored programs. The VCU 144 derives distance information from the speed sensor 154, using well-known integration techniques. The programmed VCU 144 cooperates with the elements shown in FIGS. 1 and 2 and thereby implements the function management system of the invention.

Figure 4:
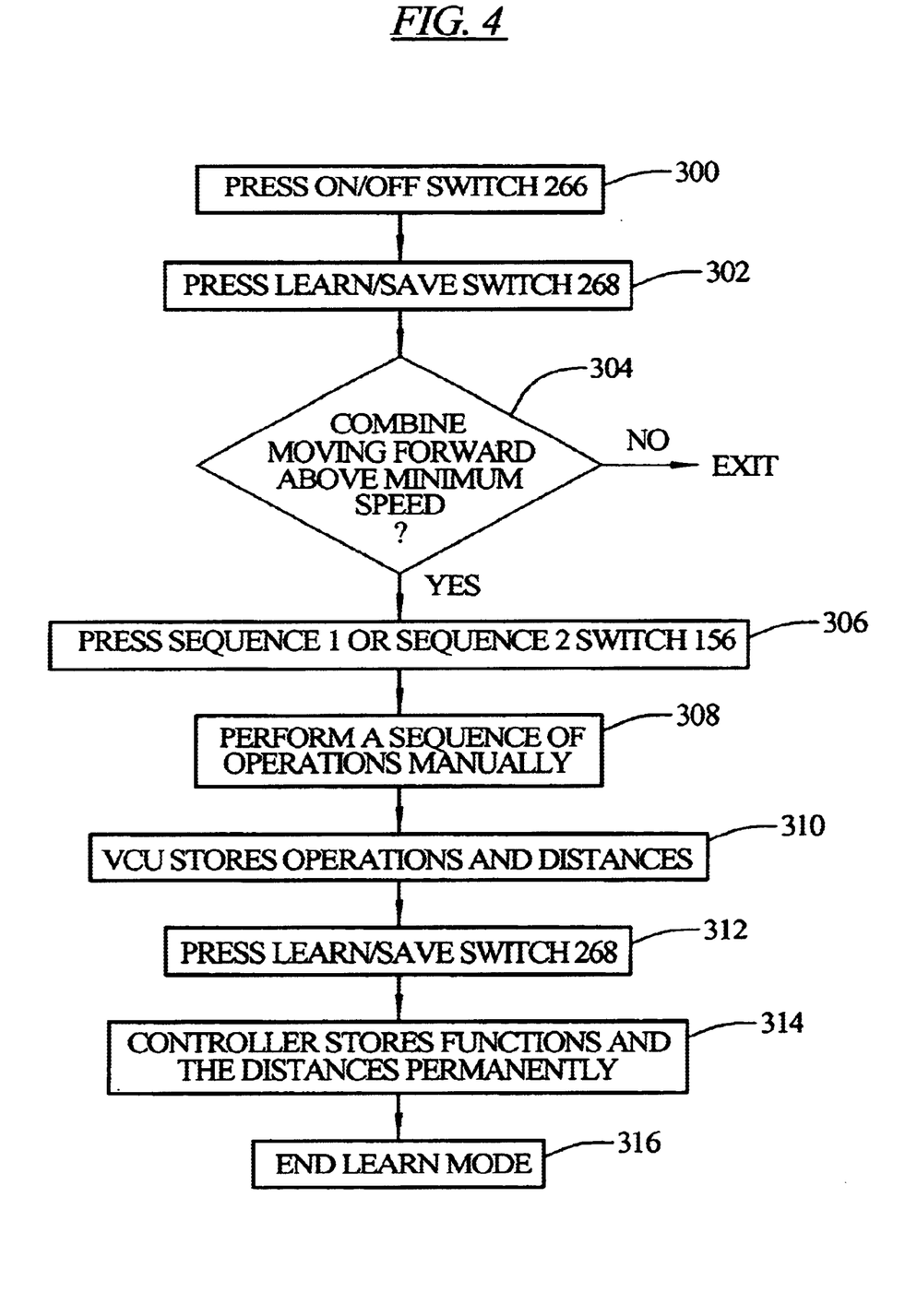
FIG. 4 is a simplified logic flow diagram illustrating the operation of the learn/save mode of the present invention.

Referring to FIG. 4, the Learn Mode operates as follows. First, at step 300 the system is turned on by pressing the on/off switch 266, and the IMS display indicator 270 turns on. Pressing "learn/save" switch 268 at step 302 activates the learn/save mode and the IMS indicator 270 will begin to flash and a beep with occur periodically. Step 304 allows the learn/save mode to continue if the combine is moving faster than a pre-selected minimum speed. The minimum speed can be zero or greater.

At step 306, the operator momentarily toggles the sequence switch 156 to its sequence one or its sequence two position, and the corresponding sequence number of indicator 272 will begin to flash. Then as indicated at 308, the operator can perform a sequence of manually performed function operations, such as shifting the transmission 118 by manipulating the shift lever 150, or such as by raising and/or lowering the header by manipulating the header raise/lower switch 146.

As indicated at 310, the VCU 144 records (in a temporary memory) all the manually performed operations together with the various distances traversed by the combine between the various manually initiated operations. Distances are calculated based on actual speed sensed by the sensor 154 and are recorded with a resolution in millimeters. Distance information is recorded only when the combine is moving forward or only when the combine is moving forward faster than a minimum speed.

At step 312, the learn/save switch 268 is pressed again and as indicated by step 314, the VCU 144 stores in a permanent memory the sequence of operations and corresponding distances as either a sequence 1 or a sequence 2, depending on how the switch 156 was previously toggled. The learn/save mode then ends at step 316 and the flashing sequence number 272 stops flashing and the IMS indicator 270 alone remains lit.

Figure 5:
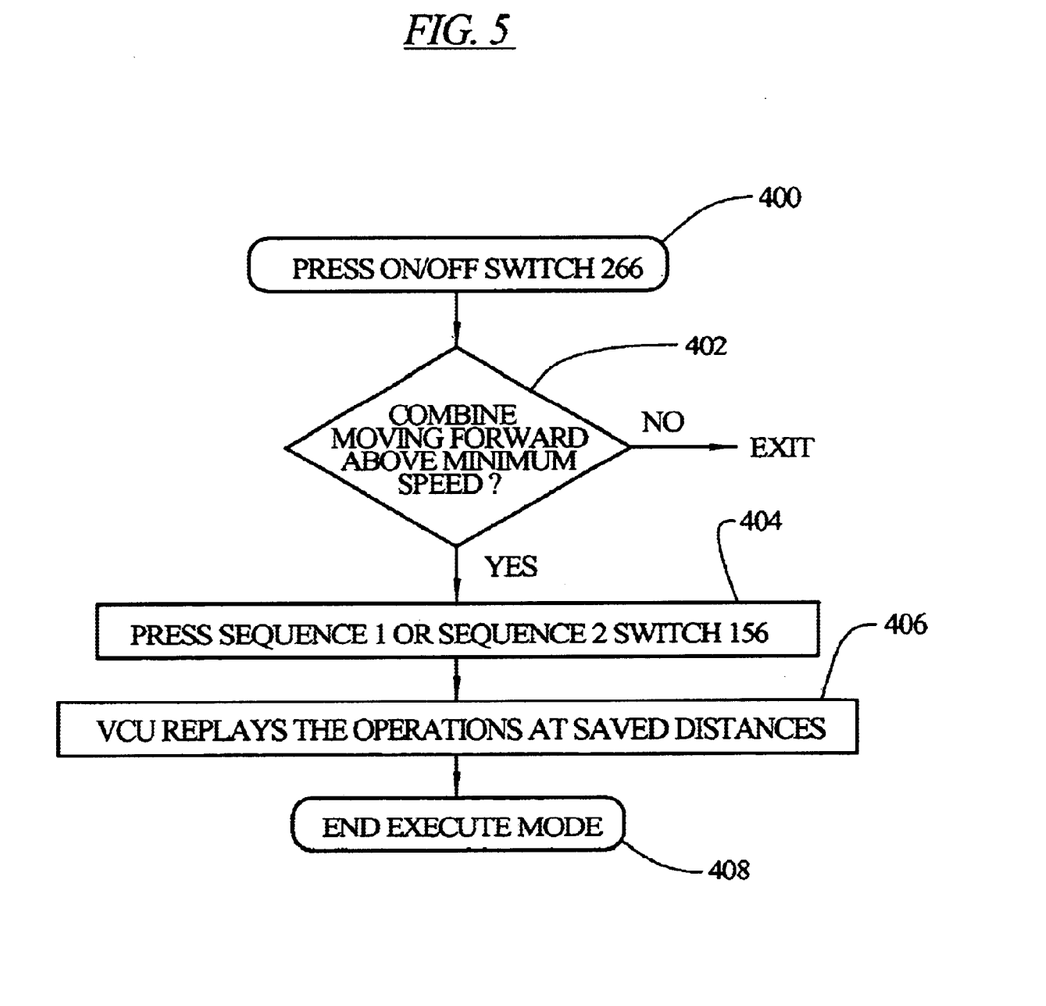
FIG. 5 is a simplified logic flow diagram illustrating the operation of the execution mode of the present invention.

After one or more sequences of operations and distances has been learned and saved by the learn/save mode, the execute mode illustrated by FIG. 5 can be performed. At the step 400, the on/off 266 is pressed to turn on the system, and the IMS status indicator 270 turns on. Step 402 allows the execute mode to be performed if the combine is moving faster than a pre-selected minimum speed (which could be zero or greater).

At step 404, when the combine reaches a location in a field at which the operator desires to execute a stored sequence of operations, the operator momentarily toggles sequence switch 156 to its sequence one or its sequence two position to select which stored sequence will be replayed, and the corresponding "1" or "2" on display 272 is lit. The "1" or "2" sequence indicator 272 will remain on at least three seconds, even if the sequence being executed requires less than three seconds to be executed. Then as indicated at step 406, the VCU 144 automatically performs the selected sequence of stored operations, such as automatically shifting the transmission 112 without the operator manipulating the shift lever 150, or such as by automatically raising or lowering the header without the operator manipulating the header raise/lower switch 146. These stored operations will be replayed with the same relative sequences therebetween as when they were learned, regardless of whether or not the combine is traveling at the same, slower or faster speed. At the completion of a sequence execution, the number 1 or 2 of display 272 will be turned off. The execute mode then ends at step 408.

With two learned sequences in the system turned on (and as long as the combine is moving forward faster than a pre-selected minimum speed, the pre-selected minimum speed being zero or greater), the operator may cause the first sequence to be automatically played by momentarily toggling the sequence switch 156 to its "1" position, for example, at the end of every crop row. Similarly, the operator may cause the second sequence to be automatically replayed by momentarily toggling the sequence switch 156 to its "2" position at the start of every crop row.

Thus, the function management system described herein can be used to automatically replay a sequence of operations at the start of every crop row or cut with a single momentary actuation of sequence switch 156, and to automatically replay a different sequence of operations at the end of every crop row or cut with a different single momentary actuation of the switch 156. Because the function management system operates on the basis of distances traveled by the combine, instead of on the basis of time integrals, the sequences can be "learned" slowly as the tractor is moving slowly, and automatically executed or replayed faster as the combine moves at normal operating speeds. This allows the operator plenty of time to operate the "learn" mode and have the control unit 144 "learn" a complex sequence of operations.

During the operations described above, the invention also operates as follows. A beep will occur when the on/off switch 266 is pressed. When a system is turned on, the contents of the stored sequences will be displayed on the monitor/display 148. Each sequence, starting with sequence 1, will display each event that was learned and recorded every two seconds followed by the display of "end" on display 262.

Learned sequences are retained indefinitely. A maximum preset number, such as 12 operations, can be recorded. The operator can delete a learned sequence from memory. If the "learn/save" mode is canceled during the learning process, i.e., the sequence was not completed normally, then the sequence is cleared from memory. A saved sequence can be removed from memory by entering learn/save mode normally, selecting a sequence, and then hitting the learn/save switch 268 without operating any vehicle functions. This causes the system to exit the learn/save mode and discontinue flashing the sequence number indicator 272 while the "IMS" indicator 270 alone remains on.

Once the learn/save mode is completed, no operations can be added to the sequence. Distance information will be accumulated only while the combine is in forward drive and above the pre-selected minimum speed.

The learn/save mode may also be canceled by switching the on/off switch 266 to off or, by: a) not selecting a sequence with sequence switch 156 within a pre-selected time period, b) not learning any operations within a pre-selected time period of the time the sequence switch 156 is toggled, c) not actuating the learn/save mode switch 268 (step 312) within a pre-selected time period after a sequence of operations is learned, d) shifting the transmission 118 out of a forward drive, or e) the operator not being present and the combine not moving for more than a pre-selected time period.

There may be some desired sequences of operations where after the learn/save mode is initiated; the combine is intentionally driven for an accumulated distance before commands for a sequence of operations are started. It may be advantageous then to eliminate the cancellation triggers of steps b) and c) of the preceding paragraph.

The "IMS" status indicator 270 in the display 262 lights up when the system is on. If the on/off switch 266 is pressed while the function management system is on, then the system shuts off the function management system and turns off the IMS indicator 270. If the on/off switch 266 is pressed and the sequence switch 156 is not in the neutral position, then the function management system will not be turned on. If the system is in its learn/save mode when the function management system is turned off, then the learn/save mode will be canceled and no sequence of operation will be saved. If the system is executing (replaying) a sequence when the function management system is turned off, the execution of the sequence will abort. If the learn/save mode switch 268 is pressed when the function management system is on, the system shall enter into the learn/save mode. A beep will occur when the learn/save mode touch pad switch 268 is pressed. The "IMS" status indicator 270 on display 262 will flash during learn mode and every pre-selected number of seconds, the VCU 144 will generate a beep. If the function management system is not on, pressing the learn/save switch 268 will have no effect.

If the function management system is off, pressing either part of the sequence switch 156 will have no effect. If the function management system is on and the sequence switch 156 transitions from the neutral position to either the sequence one position or the sequence two position, then the system will begin executing (replaying) the sequence. If the sequence switch 156 is pressed while the learn mode is active, the system will begin learning subsequently manually performed operations.

Execution of a sequence will always begin at the first operation of the sequence, even if the sequence was previously aborted. During execution mode, the system will always command the learned operation for a function. If the function is already in the state which would result from performance of the learned operation, then the system will have no effect on that function. For example, if the operation is to raise the header, but the header is already fully raised, then execution merely passes along to the next operation of the sequence. If a sequence is already in process and then the sequence switch 156 is toggled for the corresponding sequence again, then the toggling of switch 156 will be ignored and the sequence execution will continue. If a sequence is already in process and then the sequence switch 156 is toggled for the other sequence, then the system will abort the execution of the sequence. If a function is disabled at the time a sequence is commended, then the system will not execute the sequence.

The header and auger are positioned by the VCU during execute mode based on the learned operation that positions the header or auger according to the absolute position sensed by the sensors 206, 207 respectively.

The operator can use the brake pedals to stop the system accumulating distance during a learn/save mode, and to temporarily pause the automatic performance of an operation during execution of a saved sequence. Once thirty seconds has expired, unless the brake pedals are released, the sequence will abort. The system will also prevent execution of a sequence if the transmission gear is above a pre-selected maximum gear unless the sequence was learned above the maximum gear.

If the operator manually operates a function during automatic sequence execution, then that manually operated function (under this function management system) will be inhibited for the remainder of the execution of the sequence. The other operation of the sequence will be performed as learned, and the particular manually operated operation will not be deleted from the learned sequence.

As an example of the combine function management system, the situation of a combine approaching the end of cut and turning around and reentering the field at the start of a new cut can be controlled. The end of the cut can be sensed by the crop sensor 157 for automatic deployment of the function management system, or can be seen by the operator for a manual trigger of the function management system. Certain functions must be undertaken at the end of the cut. If the functions are automatically or manually actuated for a sequence one routine, the following actions could be pre-programmed into the VCU 144. The header is raised by the header raise-and-lower system 141. The auger deployment system 172 is actuated to retract the auger so as not to strike external objects when the combine is turning around for the next cut. The rotor drive system 182 can be actuated to disengage the rotor clutch so that the rotor is not rotated. The steering system can be automatically controlled to exit the cut and turn to reenter the field. The steering system can be further controlled by the VCU 144 according to signals from the GPS 158. After leaving the cut, the transmission 118 can be controlled to shift into a higher gear. The engine throttle 208 can also be moved to increase engine speed. The four-wheel drive valve 204 can be actuated to disengage four-wheel drive hydraulic motors 124a, 124b. The vehicle brakes can be selectively applied to assist steering. These automatic steps increase maneuverability, speed, fuel efficiency and power.

When the combine reenters the field, many of these controls are reversed. The four-wheel drive valve 204 is actuated to deliver hydraulic fluid to the hydraulic motor 124a, 124b for four-wheel drive mode. The brakes are released. The engine throttle 208 is adjusted for reduced engine speed. The transmission clutches 120 are manipulated to down shift to a lower, more powerful gear. The steering system control can be returned to manual operation or controlled for accurate combine movement along the cut according to a position signal from the GPS 158. The rotor drive clutch 212 can be actuated to commence rotation of the combine rotor. The separator is adjusted via the separator adjust system 176. The header 16 is lowered for entering the cut. The auger 172 is deployed substantially perpendicularly to the direction of travel of the combine.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A combine system comprising:

a chassis;

a header having a front portion for gathering a crop and operable to be movable between a lowered position and a raised position;

a lifting device connected between a chassis of said combine and said header and operable to lift said header from said lowered position to said elevated position;

at least one speed control device operable to control the ground speed of the combine;

a control signal connected to said lifting device and to said speed control device;

said control including a memory for raising and lowering said header using said lift cylinder and for adjusting the ground speed of said combine according to a programmed routine; and an operator selection switch signal connected to said control and operable to commence said routine.

2. The combine system according to claim 1, further comprising a four wheel drive selection mechanism operable to select between a two wheel drive system and a four-wheel drive system, said control signal connected to said drive selection mechanism and said routine including engagement or disengagement of said four wheel drive system.

3. The combine system according to claim 1, comprising an unload auger rotation device, said rotation device signal-connected to said control, said routine including rotating said unload auger by action of said rotation device.

4. The combine system according to claim 1, comprising a steering device, said steering device signal-connected to said control, said routine including automatically steering said combine by action of said steering device.

5. The combine system according to claim 1, comprising a braking device, said braking device signal-connected to said control, said routine including automatically braking said combine by action of said braking device.

6. The combine system according to claim 1, comprising a separator adjustment device, said separator adjustment device signal-connected to said control, said routine including adjusting said separator by action of said separator adjustment device.

7. The combine system according to claim 1, comprising a rotor engagement device, said rotor engagement device signal-connected to said control, said routine including engaging said rotor by action of said rotor engagement device.

8. The combine system according to claim 1, wherein said routine includes monitoring a feedback signal from a global positioning signal.

9. The combine system according to claim 1, comprising:

an operator actuatable learn/save switch signal-connected to the control;

wherein said control includes a learn mode, the learn mode being operable while the vehicle is moving, and wherein, in response to a manually triggered sequence of operations, including header positioning, the control stores the sequence of operations as stored instructions that are synchronized in memory with corresponding vehicle travel; and wherein said control includes a replay mode, wherein the control automatically performs said stored sequence of operations synchronized with vehicle travel according to said stored instructions.

10. The combine system according to claim 1, comprising:

an operator actuatable learn/save switch signal-connected to the control;

wherein said control includes a learn mode, the learn mode being operable while the vehicle is moving, and wherein, in response to a manually triggered sequence of operations, including header positioning and changing of vehicle speed, the control stores information pertaining to the sequence of operations and stores information pertaining to distance intervals between operations with respect to the movement of the combine during performance of said sequence of operations; and wherein said control includes a replay mode, wherein the control automatically performs said stored sequence of operations and wherein the operations of said sequence are performed with distance intervals therebetween which are substantially the same as that which occurred during operation of the learn mode, regardless of the speed of the vehicle.

\* \* \* \* \*